United States Patent
Wang et al.

(10) Patent No.: US 12,051,208 B2
(45) Date of Patent: *Jul. 30, 2024

(54) THREE-DIMENSIONAL (3D) DEPTH IMAGING SYSTEMS AND METHODS FOR DYNAMIC CONTAINER AUTO-CONFIGURATION

(71) Applicant: ZEBRA TECHNOLOGIES CORPORATION, Lincolnshire, IL (US)

(72) Inventors: Lichen Wang, Malden, MA (US); Yan Zhang, Buffalo Grove, IL (US); Kevin J. O'Connell, Palatine, IL (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/626,047

(22) PCT Filed: Jul. 10, 2020

(86) PCT No.: PCT/US2020/041648
§ 371 (c)(1),
(2) Date: Jan. 10, 2022

(87) PCT Pub. No.: WO2021/007537
PCT Pub. Date: Jan. 14, 2021

(65) Prior Publication Data
US 2024/0037751 A1     Feb. 1, 2024

Related U.S. Application Data

(63) Continuation-in-part of application No. 16/509,228, filed on Jul. 11, 2019, now Pat. No. 11,010,915.

(51) Int. Cl.
*G06T 7/12* (2017.01)
*B65D 88/12* (2006.01)
(Continued)

(52) U.S. Cl.
CPC .............. *G06T 7/12* (2017.01); *B65D 88/121* (2013.01); *B65D 90/48* (2013.01); *G06T 7/13* (2017.01);
(Continued)

(58) Field of Classification Search
None
See application file for complete search history.

(56) References Cited

U.S. PATENT DOCUMENTS 10,005,564 B1 *  6/2018  Bhatia ....................... B64C 1/20
11,010,915 B2 *  5/2021  Wang ..................... H04N 23/54
(Continued)

FOREIGN PATENT DOCUMENTS

CN     101911103 A    12/2010
CN     108897246 A    11/2018
(Continued)

OTHER PUBLICATIONS

International Search Report and Written Opinion for International Application No. PCT/US2020/041648 mailed on Sep. 28, 2020.
(Continued)

*Primary Examiner* — Jeffrey J Chow

(57) ABSTRACT

Three-dimensional (3D) depth imaging systems and methods are disclosed for dynamic container auto-configuration. A 3D-depth camera captures 3D image data of a shipping container located in a predefined search space during a shipping container loading session. An auto-configuration application determines a representative container point cloud and (a) loads an initial pre-configuration file that defines a digital bounding box having dimensions representative of the predefined search space and an initial front board area; (b) applies the digital bounding box to the container point cloud to remove front board interference data from the container point cloud based on the initial front (Continued)

board area; (c) generates a refined front board area based on the shipping container type; (d) generates an adjusted digital bounding box based on the refined front board area; and (e) generates an auto-configuration result comprising the adjusted digital bounding box containing at least a portion of the container point cloud.

20 Claims, 11 Drawing Sheets

(51) Int. Cl.
    *B65D 90/48* (2006.01)
    *G06T 7/13* (2017.01)
    *G06T 7/521* (2017.01)
    *G06T 7/70* (2017.01)
(52) U.S. Cl.
    CPC ............... *G06T 7/521* (2017.01); *G06T 7/70* (2017.01); *B65D 2590/0083* (2013.01); *G06T 2200/04* (2013.01); *G06T 2200/24* (2013.01); *G06T 2207/10028* (2013.01); *G06T 2207/10048* (2013.01)

(56) References Cited

U.S. PATENT DOCUMENTS

| | | | |
|---|---|---|---|
| 2016/0133026 A1 | 5/2016 | Patel et al. | |
| 2016/0239795 A1 | 8/2016 | Burch, V et al. | |
| 2017/0178333 A1 | 6/2017 | Zhang et al. | |
| 2017/0280125 A1* | 9/2017 | Brown | B65G 1/00 |
| 2017/0302905 A1 | 10/2017 | Shteinfeld et al. | |
| 2017/0358087 A1 | 12/2017 | Armeni et al. | |
| 2018/0174325 A1 | 6/2018 | Fu et al. | |
| 2018/0189967 A1* | 7/2018 | Zhang | G06T 7/50 |
| 2019/0197171 A1 | 6/2019 | Tiwari et al. | |
| 2019/0197719 A1 | 6/2019 | Barish et al. | |
| 2020/0234071 A1* | 7/2020 | Yuvaraj | G06V 10/25 |
| 2020/0279208 A1* | 9/2020 | Kumar | G06V 10/245 |
| 2020/0372664 A1* | 11/2020 | He | G01S 17/931 |

FOREIGN PATENT DOCUMENTS

| | | |
|---|---|---|
| CN | 109564174 A | 4/2019 |
| DE | 112016005287 T5 | 8/2018 |

OTHER PUBLICATIONS

Examination Report for German Patent Application No. 112020003332.5 mailed on Jan. 12, 2023.
Office Action for Chinese Patent Application No. 202080048613.6 mailed on May 27, 2022.

\* cited by examiner (INPUT POINT CLOUD)

(2.5D TEMPLATE MATCHING APPROACH)

(AUTO-CONFIGURE NORMAL LOADING)

(TARGET CONTAINER DATA CAPTURE)

(EXAMPLE 1 : AUTO-CONFIGURATION RESULT OUTPUT)

(EXAMPLE 2 : AUTO-CONFIGURATION RESULT OUTPUT)

THREE-DIMENSIONAL (3D) DEPTH IMAGING SYSTEMS AND METHODS FOR DYNAMIC CONTAINER AUTO-CONFIGURATION

BACKGROUND OF THE INVENTION

In the transportation industry, shipping containers (e.g., shipping containers as used in air and/or ground transportation and shipping, such as unit load devices (ULDs)) are typically loaded using a variety of different techniques that take into account a variety of different sizes and configurations of boxes, packages, or other items for shipping or transit. In addition, shipping containers, themselves, typically have various sizes and storage capacities (e.g., where such shipping containers are constructed to handle different cargo sizes, loads and/or configurations). All of the various loading techniques, box sizes/configurations, and shipping container sizes/configurations create various permutations of loading strategies, techniques, and differences in overall loading operations that are difficult for loaders and/or managers overseeing loading of such commercial trailers to manage.

Such various permutations of loading strategies, sizes, and configurations create problems in tracking performance or quality of loading metrics across different personnel (e.g., loaders), each of which may be located in different geographic locations and/or employ different loading regimens. In particular, loaders or managers may desire a greater understanding and improved metrics relating to the efficiency of how their shipping containers are loaded so that they can employ or make better management decisions to improve loading time or otherwise loading efficiency for logistical operations associated with shipping containers.

In addition, problems arise from traditional shipping container (e.g., ULD) loading strategies and techniques. For example, accurate container position information is essential for other analytical algorithms, such as ULD fullness algorithms, to achieve acceptable performance. Current ULD position information is provided manually and assume that that containers remain static. However, because shipping containers and/or camera positions can shift during a loading process, a problem arises as to how to dynamically provide position information with a high degree of accuracy. These problems can become especially acute where an algorithm can make certain (incorrect) assumptions based on positioning. For example, a ULD position is traditionally setup by (human) visual checking, which is time consuming and less efficient. More importantly, there are non-negligible shifts of both containers and cameras in routine loading process, which could reduce performance and accuracy of loading analytical algorithms. Accordingly, various problems generally arise regarding how to dynamically localize and configure container position automatically, efficiently, and accurately.

Several conventional techniques attempt to solve these problems. Each, however, has specific drawbacks. For example, a direct 3D matching technique may be employed to match a target point cloud to a 3D template point cloud. However, the direct 3D matching technique is not robust in that it lacks stable and repeatable results, is also sensitive to partial structures, and involves in high computation complexity. In addition, the matching is not accurate, which generally leads to erroneous and generally inaccurate reporting.

A second conventional technique includes point cloud clustering. Point cloud clustering, however, is also not robust as it lacks stable and repeatable results, in particular, it suffers from uncontrollable 3D data segmentation results. The point cloud clustering technique is additionally sensitive to "noise" (e.g., loaders/personnel moving through the loading area) and small object interference (e.g., a package being moved within the loading area). Because of this, point cloud clustering typically creates incorrect clustering results due to loader and package interference.

A third conventional technique includes 2.5D template matching. 2.5D template matching, however, is also not robust as it lacks stable and repeatable results. In particular, 2.5D template matching is not robust in that package and loader interference generally creates an incorrect clustering result that the 2.5D template matching relies on. In addition, 2.5D template matching requires intensive computation to achieve real-time localization and can suffer from incorrect ground fitting.

Accordingly, conventional techniques fail to provide fast and efficient solutions for real-time/dynamic container loading, which would, for example, provide solutions for real-time localization. These conventional techniques suffer from typical loading challenges which include package and loader occlusion and interference, different types and sizes of containers, and other typical loading issues, such as whether a shipping container has a door closed or open.

Accordingly, there is a need for three-dimensional (3D) depth imaging systems and methods for dynamic container auto-configuration that allow for fast and efficient real-time localization for shipping container loading and diagnostics.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
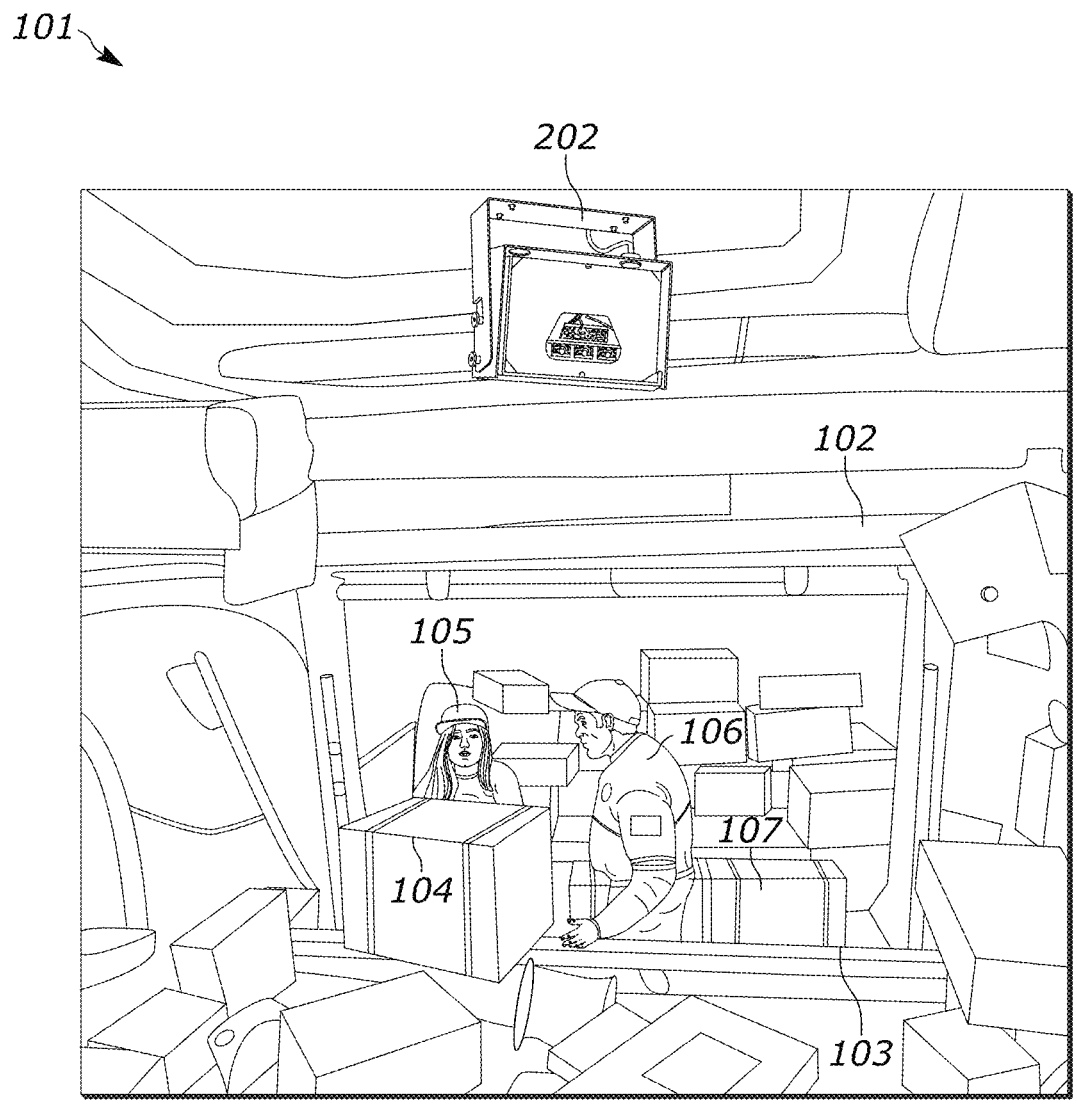
FIG. 1 is a perspective view, as seen from above, of a predefined search space of a loading facility that depicts a load monitoring unit (LMU) having a 3D-depth camera oriented in a direction to capture 3D image data of a shipping container during a shipping container loading session, in accordance with example embodiments herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Accordingly, systems and methods are described herein that provide dynamic auto-configuration. More generally, the disclosures herein relate to providing container loading analytics (CLA), such as fullness analytics. In addition, the present disclosure relates to dynamic container auto-configuration (DCAC) systems and methods for dynamically localizing (identification of a particular place or area), loading, or otherwise preparing for shipment shipping containers. The systems and methods described herein replace conventional manual ULD configuration processes by automatically providing highly accurate container position information to analytical algorithms in real time. The present disclosure proposes an efficient, accurate, and robust approach to dynamically localize containers even during normal container loading procedure. This approach improves efficiency and accuracy of known analytical algorithms.

In addition, the present disclosure describes inventive embodiments that eliminate the fullness error cases where the containers shift from pre-calibrated location. In contrast to conventional systems and methods, which either underestimate or overestimate the fullness when the container shifts from pre-calibrated location, the embodiments of the present disclosure dynamically detect the location of the container and feed this info to the fullness analytics. For example, in particular embodiments, this invention detects the ULD boundary through frontal ULD structure localization based on 3D point cloud analysis. As will be described further herein, embodiments of the present disclosure simplify and automate the calibration efforts for multiple types of containers. For example, embodiments of the present disclosure allow for imaging of multiple types of ULDs including AMJ, AAD, AKE, AYY, SAA, APE, and AQF types. Without benefits of the present disclosure, calibration efforts would remain substantial and tedious.

Accordingly, in various embodiments disclosed herein, a 3D depth imaging system is disclosed for dynamic container auto-configuration. The 3D depth imaging system may include a 3D-depth camera configured to capture 3D image data. The 3D-depth camera may be oriented in a direction to capture 3D image data of a shipping container located in a predefined search space during a shipping container loading session. The shipping container may having a shipping container type.

The 3D depth imaging system may further include a container auto-configuration application (app) configured to execute on one or more processors and to receive the 3D image data. The container auto-configuration app may be configured to determine, based on the 3D image data, a container point cloud representative of the shipping container.

The auto-configuration app may be further configured to execute on the one or more processors to load an initial a pre-configuration file corresponding to the predefined search space. The pre-configuration file may further define a digital bounding box having dimensions representative of the predefined search space. The digital bounding box made include an initial front board area.

The auto-configuration app may be further configured to apply the digital bounding box to the container point cloud to remove front board interference data from the container point cloud based on the initial front board area.

The container auto-configuration app may be further configured to generate a refined front board area based on the shipping container type. The refined front area board may define each of (1) a right edge, (2) a left edge, and (3) a top edge of the refined front board area.

The container auto-configuration app may be further configured to generate an adjusted digital bounding box by modifying, based on the refined front board area and the shipping container type, one or more digital walls of the digital bounding box. The one or more digital walls can include at least (1) a left wall, (2) a right wall, and (3) a ground wall.

The container auto-configuration app may be further configured to generate an auto-configuration result that comprises the adjusted digital bounding box containing at least a portion of the container point cloud.

In addition, a 3D depth imaging method is disclosed for dynamic container auto-configuration. The 3D depth imaging method may include capturing, by a 3D-depth camera, 3D image data of a shipping container located in a predefined search space during a shipping container loading session. The shipping container may comprise a certain shipping container type.

The 3D depth imaging method may further include receiving, at a container auto-configuration application (app) executing on one or more processors, the 3D image data. The 3D depth imaging method may further include determining, by the container auto-configuration app, a container point cloud representative of the shipping container based on the 3D image data.

The 3D depth imaging method may further include loading, by the container auto-configuration app, an initial a pre-configuration file corresponding to the predefined search space. The pre-configuration file may define a digital bounding box having dimensions representative of the predefined search space. The digital bounding box may include an initial front board area.

The 3D depth imaging method may further include applying, by the container auto-configuration app, the digital bounding box to the container point cloud to remove front board interference data from the container point cloud based on the initial front board area.

The 3D depth imaging method may further include generating, by the container auto-configuration app, a refined front board area based on the shipping container type. The refined front area board may define each of (1) a right edge, (2) a left edge, and (3) a top edge of the refined front board area.

The 3D depth imaging method may further include generating, by the container auto-configuration app, an adjusted digital bounding box by modifying, based on the refined front board area and the shipping container type, one or more digital walls of the digital bounding box. The one or more digital walls may include at least (1) a left wall, (2) a right wall, and (3) a ground wall.

The 3D depth imaging method may further include generating, by the container auto-configuration app, an auto-configuration result that comprises the adjusted digital bounding box containing at least a portion of the container point cloud.

The 3D depth imaging systems and methods disclosed herein may be further appreciated by the various Figures disclosed herein.

FIG. 1 is a perspective view, as seen from above, of a predefined search space of a loading facility that depicts a load monitoring unit (LMU) having a 3D-depth camera oriented in a direction to capture 3D image data of a shipping container during a shipping container loading session, in accordance with example embodiments herein. As depicted, shipping container 102 has a shipping container type of "AMJ." Generally, a shipping container is selected from one of several differently dimensioned containers. In various embodiments, shipping containers may comprise any type of unit load device (ULD). For example, a shipping container type may be of any ULD type, including, for example, any of an AMJ type, an AAD type, an AKE type, an AYY type, a SAA type, and APE type, or an AQF type. For ULD shipping containers, the first letter (e.g., "A" for "Certified aircraft container") indicates a specific type of ULD container, such as certified, thermal, etc.; the second letter represents base size in terms of dimensions (e.g., "M" for 96×125 inch), and the third letter represents a side contour size and shape (e.g., "J" for a cube shaped ULD container having a diagonal sloping roof portion on one side only). More generally, however, a shipping container may be any aircraft-based shipping container.

Predefined search space 101 may be determined based on the shipping container size, dimensions, or otherwise configuration and/or the area in which the shipping area is localized. For example, in one embodiment, predefined search space 101 may be determined based on ULD type, shape, or position within a general area. As shown in FIG. 1, for example, predefined search space 101 is determined based on the size and dimensions of the shipping container 102 which is of type AMJ. In general, predefined search space 101 is defined so as to completely (or at least partially) include or image the shipping container. Predefined search space 101 may further include a frontal area 103 that generally defines a front position of the predefined search space 101 and/or shipping container 102.

FIG. 1 additionally depicts, within predefined search space 101, personnel or loaders 105 and 106 that load packages 104 and 107 into the shipping container 102. In the embodiment of FIG. 1, shipping container 102 is being loaded by loaders 105 with packages 104 and 107 during a loading session. The loading session includes loading a set or group of identified packages into shipping container 102. The loaders 105 and 106 and packages 104 and 107, by movement through the predefined search space 101, may generally cause occlusion and interference with the 3D-depth camera 202 (as discussed for FIG. 2) capturing 3D image data, over time, of shipping container 102.

Figure 2:
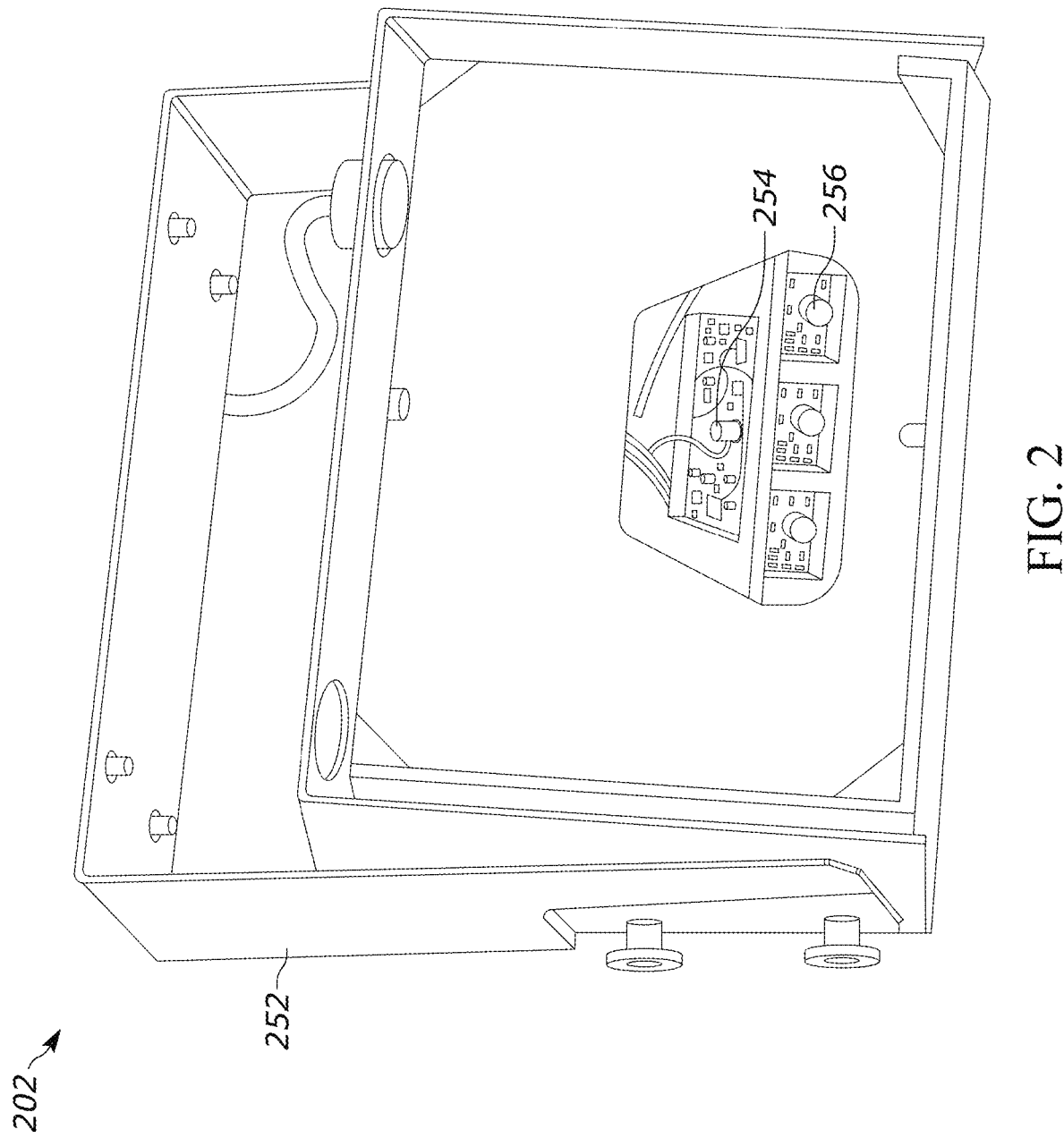
FIG. 2 is a perspective view of the LMU of FIG. 1, in accordance with example embodiments herein.

FIG. 2 is a perspective view of the LMU of FIG. 1, in accordance with example embodiments herein. In various embodiments, LMU 202 is a mountable device. Generally, an LMU 202 comprises camera(s) and a processing board and is configured to capture data of a loading scene (e.g., a scene including predefined search space 101). LMU 202 may run container fullness estimation and other advanced analytical algorithms.

LMU 202 may include a 3D-depth camera 254 for capturing, sensing, or scanning 3D image data/datasets. For example, in some embodiments, the 3D-depth camera 254 may include an Infra-Red (IR) projector and a related IR camera. In such embodiments, the IR projector projects a pattern of IR light or beams onto an object or surface, which, in various embodiments herein, may include surfaces or areas of a predefined search space (e.g., predefined search space 101) or objects within the predefined search area 101, such as boxes or packages (e.g., packages 104 and 107) and storage container 102. The IR light or beams may be distributed on the object or surface in a pattern of dots or points by the IR projector, which may be sensed or scanned by the IR camera. A depth-detection app, such as a depth-detection app executing on the one or more processors or memories of LMU 202, can determine, based on the pattern of dots or points, various depth values, for example, depth values of predefined search space 101. For example, a near-depth object (e.g., nearby boxes, packages, etc.) may be determined where the dots or points are dense, and distant-depth objects (e.g., far boxes, packages, etc.) may be determined where the points are more spread out. The various depth values may be used by the depth-detection app and/or LMU 202 to generate a depth map. The depth map may represent a 3D image of, or contain 3D image data of, the objects or surfaces that were sensed or scanned by the 3D-depth camera 254, for example, the predefined search space 101 and any objects, areas, or surfaces therein.

LMU 202 may further include a photo-realistic camera 256 for capturing, sensing, or scanning 2D image data. The photo-realistic camera 256 may be an RGB (red, green, blue) based camera for capturing 2D images having RGB-based pixel data. In some embodiments, the photo-realistic camera 256 may capture 2D images, and related 2D image data, at the same or similar point in time as the 3D-depth camera 254 such that the LMU 202 can have both sets of 3D image data and 2D image data available for a particular surface, object, area, or scene at the same or similar instance in time.

In various embodiments as described herein, LMU 202 may be a mountable device that includes a 3D-depth camera for capturing 3D images (e.g., 3D image data/datasets) and a photo-realistic camera (e.g., 2D image data/datasets). The photo-realistic camera may be an RGB (red, green, blue) camera for capturing 2D images, such as the image of FIG. 1. LMU 202 may also include one or more processors and one or more computer memories for storing image data, and/or for executing apps that perform analytics or other functions as described herein. In various embodiments, and as shown in FIG. 1, the LMU 202 may be mounted within a loading facility and oriented in the direction of predefined search space 101 to capture 3D and/or 2D image data of shipping container 102. For example, as shown in FIG. 1, LMU 202 may be oriented such that the 3D and 2D cameras of LMU 202 may capture 3D image data of shipping container 102, e.g., where LMU 202 may scan or sense the walls, floor, ceiling, packages, or other objects or surfaces within the predefined search space 101 to determine the 3D and 2D image data. The image data may be processed by the one or more processors and/or memories of the LMU 202 (or, in some embodiments, one or more remote processors and/or memories of a server) to implement analysis, functions, such as graphical or imaging analytics, as described by the one or more various flowcharts, block diagrams, methods, functions, or various embodiments herein. It should be noted that LMU 202 may capture 3D and/or 2D image data/datasets of a variety of loading facilities or other areas, such that additional loading facilities or areas (e.g., warehouses, etc.) in addition to the predefined search spaces (e.g., predefined search space 101) are contemplated herein.

In some embodiments, for example, LMU 202 may process the 3D and 2D image data/datasets, as scanned or sensed from the 3D-depth camera and photo-realistic camera, for use by other devices (e.g., client device 700 or server 301, as further described herein). For example, the one or more processors and/or one or more memories of LMU 202 may capture and/or process the image data or datasets scanned or sensed from predefined search space 101. The processing of the image data may generate post-scanning data that may include metadata, simplified data, normalized data, result data, status data, or alert data as determined from the original scanned or sensed image data. In some embodiments, the image data and/or the post-scanning data may be sent to a client device/client application, such as a dashboard app that may be, for example, installed and executing on client device 700 (as further described herein with respect to FIG. 7), for viewing, manipulation, or otherwise interaction. In other embodiments, the image data and/or the post-scanning data may be sent to a server (e.g., server 301 as further described herein) for storage or for further manipulation. For example, the image data and/or the post-scanning data may be sent to a server, such as server 301. In such embodiments, the server or servers may generate post-scanning data that may include metadata, simplified data, normalized data, result data, status data, or alert data as determined from the original scanned or sensed image data provided by LMU 202. As described herein, the server or other centralized processing unit and/or storage may store such data, and may also send the image data and/or the post-scanning data to a dashboard app, or other app, implemented on a client device, such as the dashboard app implemented on client device 700 of FIG. 7.

LMU 202 may include a mounting bracket 252 for orienting or otherwise positioning the LMU 202 within a loading facility associated with predefined search space 101 as described herein. The LMU 202 may further include one or more processors and one or more memories for processing image data as described herein. For example, the LMU 202 may include flash memory used for determining, storing, or otherwise processing the imaging data/datasets and/or post-scanning data. In addition, LMU 202 may further include a network interface to enable communication with other devices (such as server 301 of FIG. 3 as described herein). The network interface of LMU 202 may include any suitable type of communication interface(s) (e.g., wired and/or wireless interfaces) configured to operate in accordance with any suitable protocol(s), e.g., Ethernet for wired communications and/or IEEE 802.11 for wireless communications.

Figure 3:
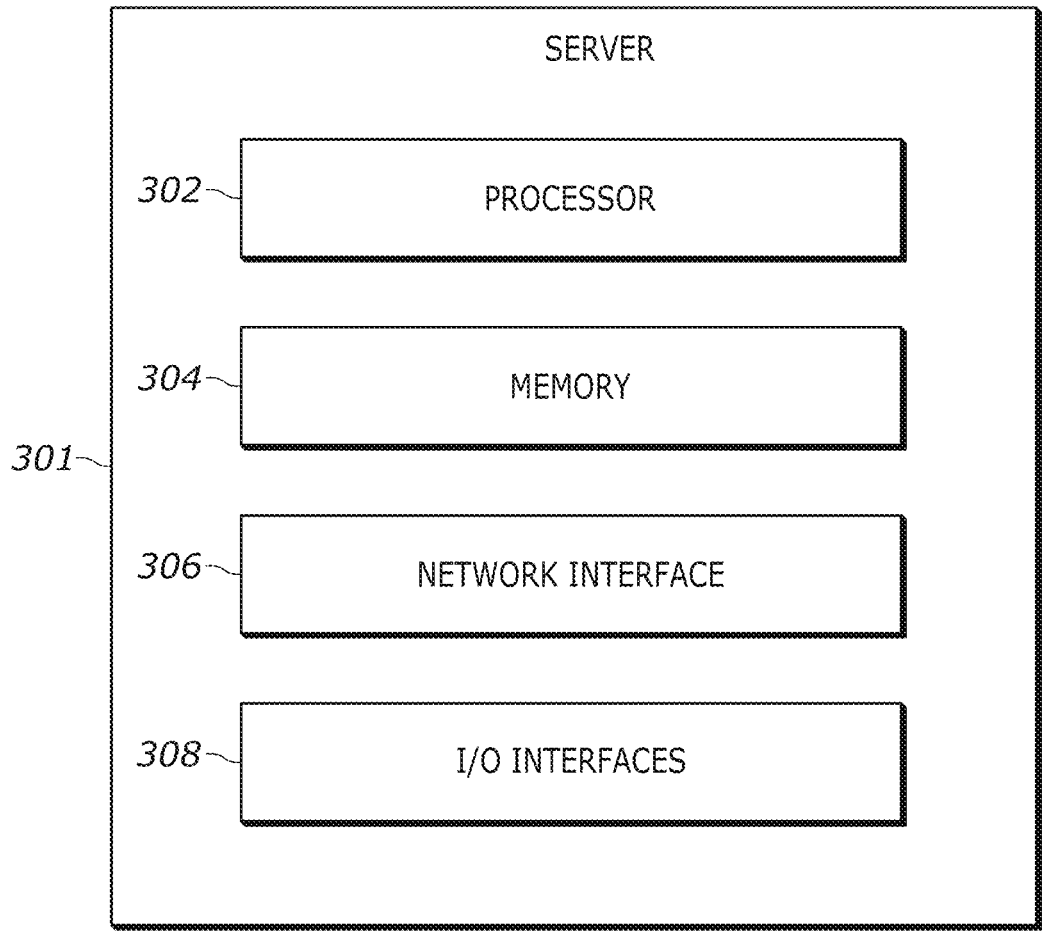
FIG. 3 is a block diagram representative of an embodiment of a server associated with the loading facility of FIG. 1 and the 3D-depth camera of FIG. 2.

FIG. 3 is a block diagram representative of an embodiment of a server associated with the loading facility of FIG. 1 and the LMU 202 of FIG. 2. In some embodiments, server 301 may be located in the same facility as loading facility of FIG. 1. In other embodiments, server 301 may be located at a remote location, such as on a cloud-platform or other remote location. In either embodiment, server 301 may be communicatively coupled to a 3D-depth camera (e.g., LMU 202).

Server 301 is configured to execute computer instructions to perform operations associated with the systems and methods as described herein, for example, implement the example operations represented by the block diagrams or flowcharts of the drawings accompanying this description. The server 301 may implement enterprise service software that may include, for example, RESTful (representational state transfer) API services, message queuing service, and event services that may be provided by various platforms or specifications, such as the J2EE specification implemented by any one of the Oracle WebLogic Server platform, the JBoss platform, or the IBM WebSphere platform, etc. Other technologies or platforms, such as Ruby on Rails, Microsoft .NET, or similar may also be used. As described below, the server 301 may be specifically configured for performing operations represented by the block diagrams or flowcharts of the drawings described herein.

The example server 301 of FIG. 3 includes a processor 302, such as, for example, one or more microprocessors, controllers, and/or any suitable type of processor. The example server 301 of FIG. 3 further includes memory (e.g., volatile memory or non-volatile memory) 304 accessible by the processor 302, for example, via a memory controller (not shown). The example processor 302 interacts with the memory 304 to obtain, for example, machine-readable instructions stored in the memory 304 corresponding to, for example, the operations represented by the flowcharts of this disclosure. Additionally or alternatively, machine-readable instructions corresponding to the example operations of the block diagrams or flowcharts may be stored on one or more removable media (e.g., a compact disc, a digital versatile disc, removable flash memory, etc.), or over a remote connection, such as the Internet or a cloud-based connection, that may be coupled to the server 301 to provide access to the machine-readable instructions stored thereon.

The example server 301 of FIG. 3 may further include a network interface 306 to enable communication with other machines via, for example, one or more computer networks, such as a local area network (LAN) or a wide area network (WAN), e.g., the Internet. The example network interface 306 may include any suitable type of communication interface(s) (e.g., wired and/or wireless interfaces) configured to operate in accordance with any suitable protocol(s), e.g., Ethernet for wired communications and/or IEEE 802.11 for wireless communications.

The example server 301 of FIG. 3 includes input/output (I/O) interfaces 308 to enable receipt of user input and communication of output data to the user, which may include, for example, any number of keyboards, mice, USB drives, optical drives, screens, touchscreens, etc.

Figure 4:
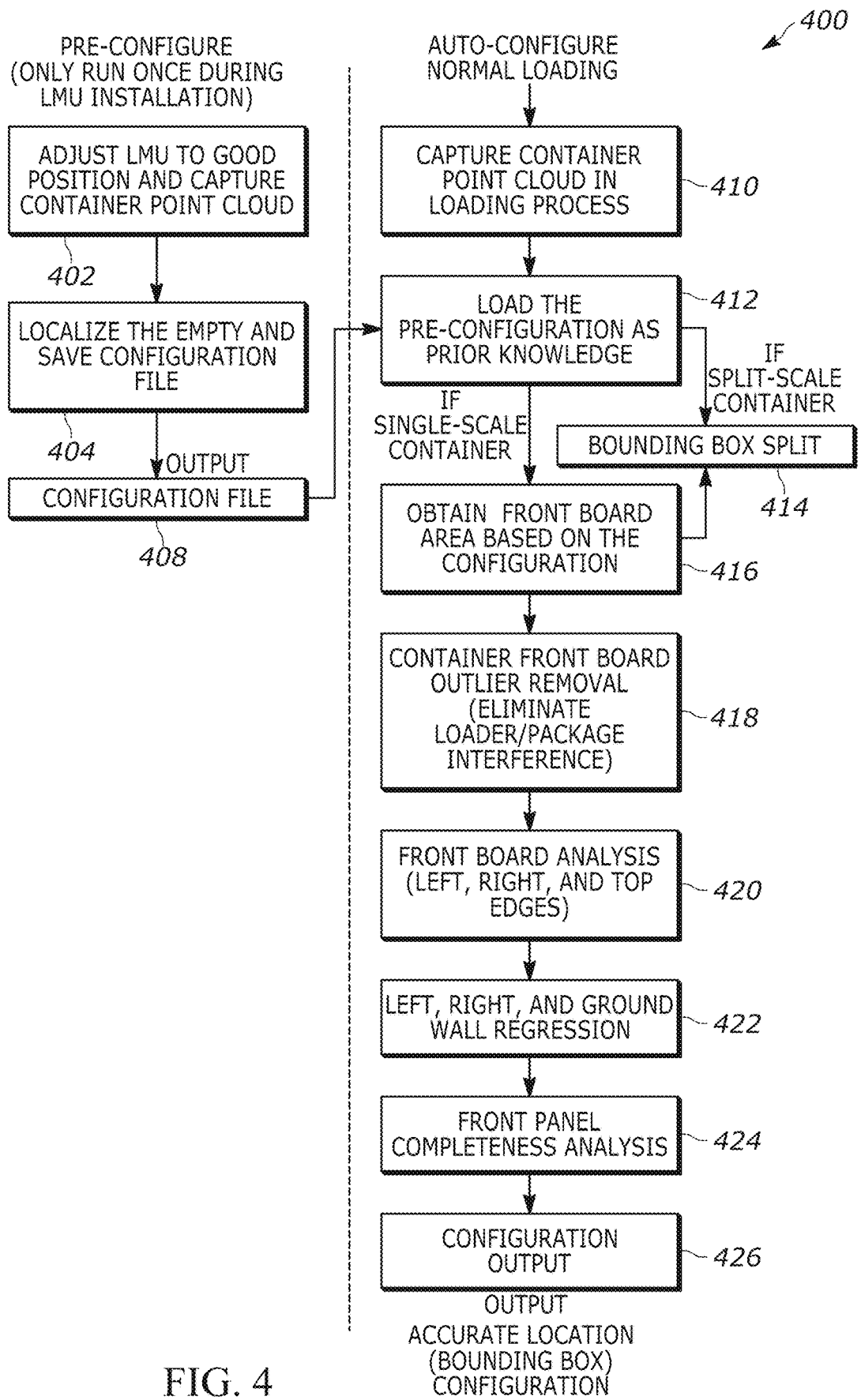
FIG. 4 is a flow chart for a 3D depth imaging algorithm for dynamic container auto-configuration, in accordance with example embodiments herein.

FIG. 4 is a flow chart for a 3D depth imaging algorithm 400 for dynamic container auto-configuration, in accordance with example embodiments herein. Algorithm 400 describes various methods for dynamic container auto-configuration as described herein. Embodiments of the a 3D depth imaging algorithm 400 for dynamic container auto-configuration of FIG. 4 is discussed below in context with FIGS. 5A-5D and FIGS. 6A-6H. FIGS. 5A-5D illustrate example embodiments of 3D and 2D images regarding generating an initial a pre-configuration file in accordance with FIG. 4, and in accordance with example embodiments herein. FIGS. 6A-6H illustrate example embodiments of 3D and 2D images regarding dynamic container auto-configuration for generating an auto-configuration result in accordance with FIG. 4, and in accordance with example embodiments herein.

Generally, the 3D depth imaging algorithm 400 of FIG. 4 comprises two overarching stages. First, an initial shipping container (e.g., ULD) position obtained during a pre-configuration routine (e.g., upon LMU installation) which is used to initialize or preconfigure imaging analytics. Next, a shipping container (e.g., ULD) front panel or region segmentation algorithm uses this pre-configuration to reduce search space and find accurate shipping container positions, e.g., for various types of ULDs. In some embodiments, 3D depth imaging algorithm 400 may execute on one or more processors of LMU 202. In other embodiments, 3D depth imaging algorithm 400 may execute in one or more processors of server 301. For example, one or more processors may be located at a server (e.g., server 301) and may be communicatively coupled to the 3D-depth camera via a digital network. Still further, 3D depth imaging algorithm 400 may execute on both LMU 202 and server 301 in a client-server format, with a first portion of 3D depth imaging algorithm 400 operating on LMU 202 and a second portion of 3D depth imaging algorithm 400 operating on server 301.

The 3D depth imaging algorithm 400 may be executed as part of a container auto-configuration application (app). Container auto-configuration app may be software implemented in a programming language such as Java, C #, Ruby, etc., and compiled to execute on the one or more processors of LMU 202 and/or server 301. For example, in one embodiment, container auto-configuration app may include a "while" loop executing to perform one or more portions of algorithm 400 upon receipt of 3D image data from 3D-depth camera. In such embodiments, receipt of the 3D image data would result in a "true" condition or state that would trigger the while loop to execute the one or more portions of algorithm 400. In still further embodiments, the container auto-configuration app may include one or more event listeners, such as a listener function programmed within the container auto-configuration app, where the listener function would receive, as a parameter, the 3D image data from 3D-depth camera when the 3D-depth camera captured 3D image data. In this way, the 3D-depth camera would "push" 3D image data to the listener function which would execute algorithm 400 using the 3D image data as described herein.

With reference to FIG. 4, at block 410, the 3D depth imaging algorithm 400 utilizes a 3D-depth camera (e.g., 3D-depth camera 254 of LMU 202) configured to capture 3D image data. In various embodiments, the 3D image data is 3D point cloud data. In addition, the 3D image data may be captured periodically, such as every 30 seconds, every minute, or every two minutes, although other various rates (e.g., other frame rates) and timings are contemplated herein.

The 3D-depth camera (e.g., of LMU 202) is generally oriented in a direction to capture 3D image data of a shipping container (e.g., shipping container 102) located in a predefined search space (e.g., predefined search space 101) during a shipping container loading session or loading process. The shipping container may have a particular shipping container type, such as type "AMJ" as shown for shipping container 102 of FIG. 1, or any other type as described herein or as otherwise designated as a ULD type of container.

Figure 6A:
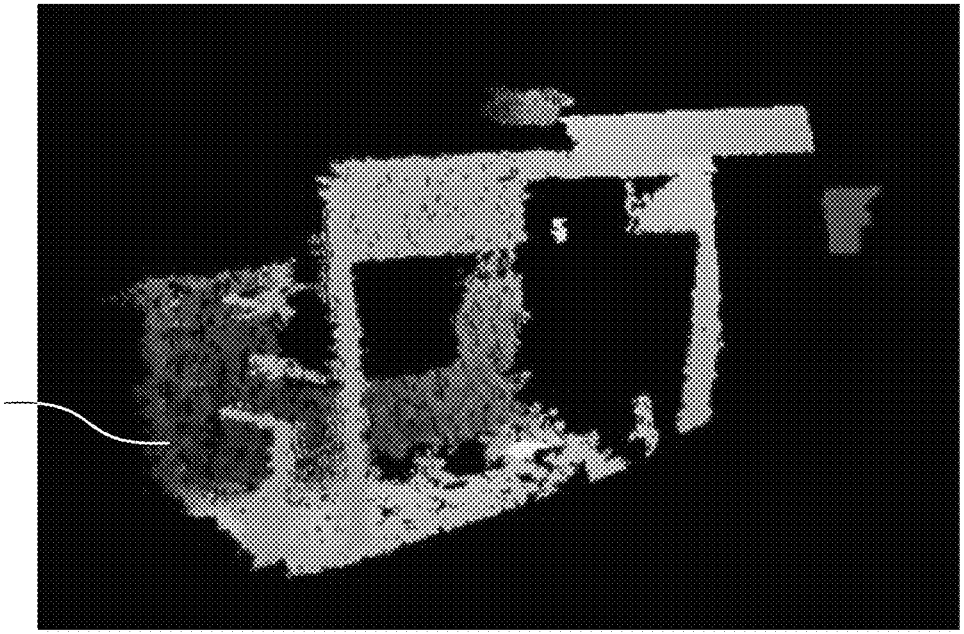
FIGS. 6A-6H illustrate example embodiments of 3D and 2D images regarding dynamic container auto-configuration for generating an auto-configuration result in accordance with FIG. 4, and in accordance with example embodiments herein.

The 3D depth imaging algorithm 400, as part of container auto-configuration app, executing on processor(s) of LMU 202 and/or server 301, may be configured to receive the 3D image data and determine, based on the 3D image data, a container point cloud representative of the shipping container 102. FIG. 6A depicts an example embodiment of 3D image data representative of shipping container 102 as captured by 3D image camera 254 of LMU 202. As shown by FIG. 6A, 3D image data includes point cloud data 602, where point cloud data may be rendered in different colors to represent different depths or distances within the point cloud. For example, in the embodiment of FIG. 6A green represents data nearer to 3D-depth camera 254 and blue represents data further away from 3D-depth camera 254.

At block 412, the container auto-configuration app is configured to execute on one or more processors (e.g., one or more processors of LMU 202 or server 301) to load an initial a pre-configuration file corresponding to the predefined search space 101 and/or shipping container (e.g., shipping container 102). Typically a large shipping container is used, such as a large ULD type so that the large space of the large ULD can be used to image other large ULDs or, in the alternative, shrunk down to accommodate and image smaller ULDs as further described herein. For example, the imaged shipping container could be based on the largest ULD type, e.g., AMJ. In addition, as part of a pre-configuration routine (blocks 402 to 408), 3D depth imaging algorithm 400 may localize an empty and shape-consistent container (e.g., normally a ULD type container such as an AAD and/or AMJ, but other types also work) without any loader/package interference in a controllable installation environment. The obtained initial ULD configuration is saved as an initial a pre-configuration file (i.e., as "prior knowledge" of predefined search space 101 and/or shipping container 102) and loaded and used as described herein.

Figure 5A:
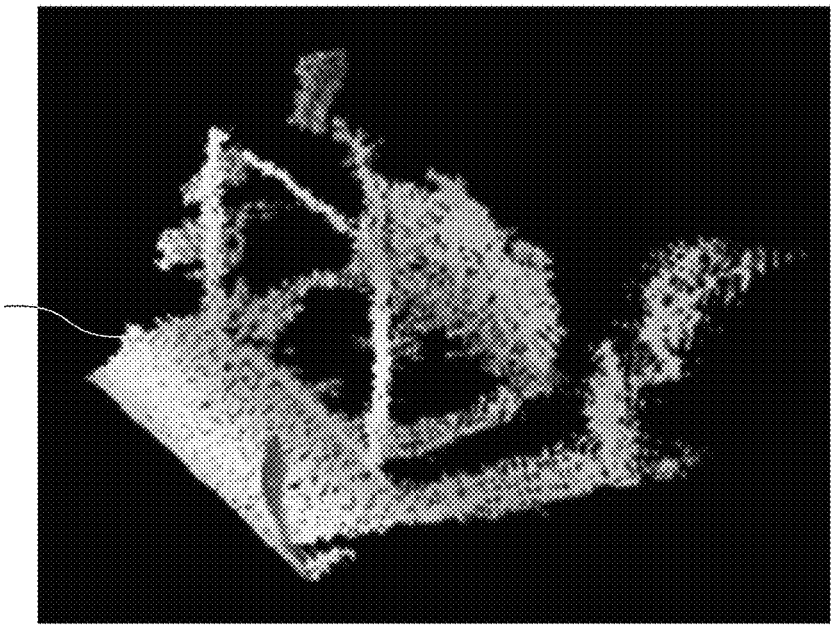
FIGS. 5A-5D illustrate example embodiments of 3D and 2D images regarding generating an initial a pre-configuration file in accordance with FIG. 4, and in accordance with example embodiments herein.
Figure 5B:
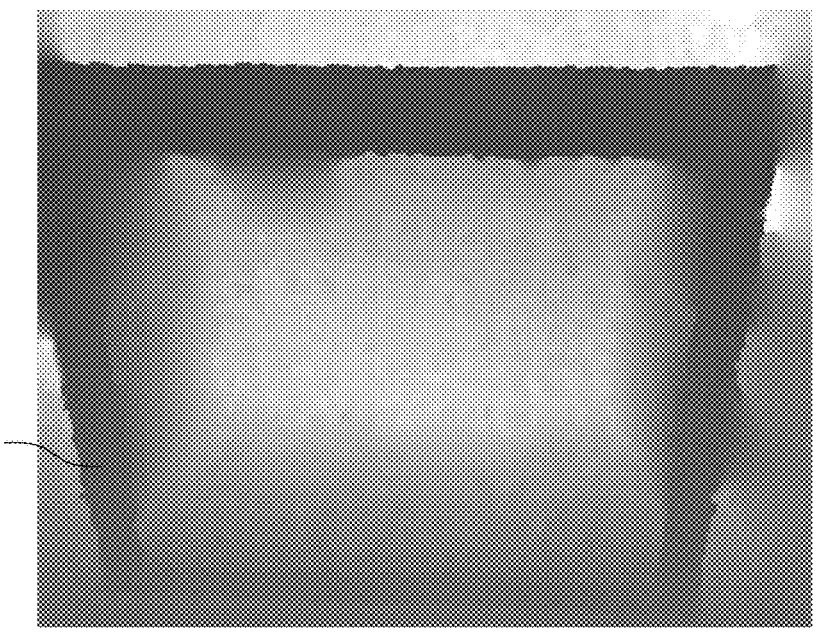
Figure 5C:
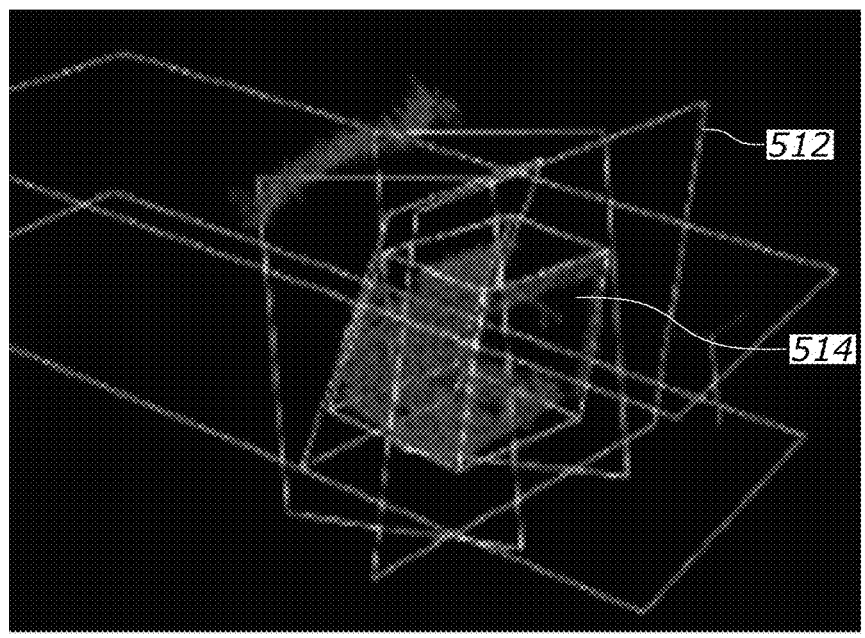
Figure 5D:
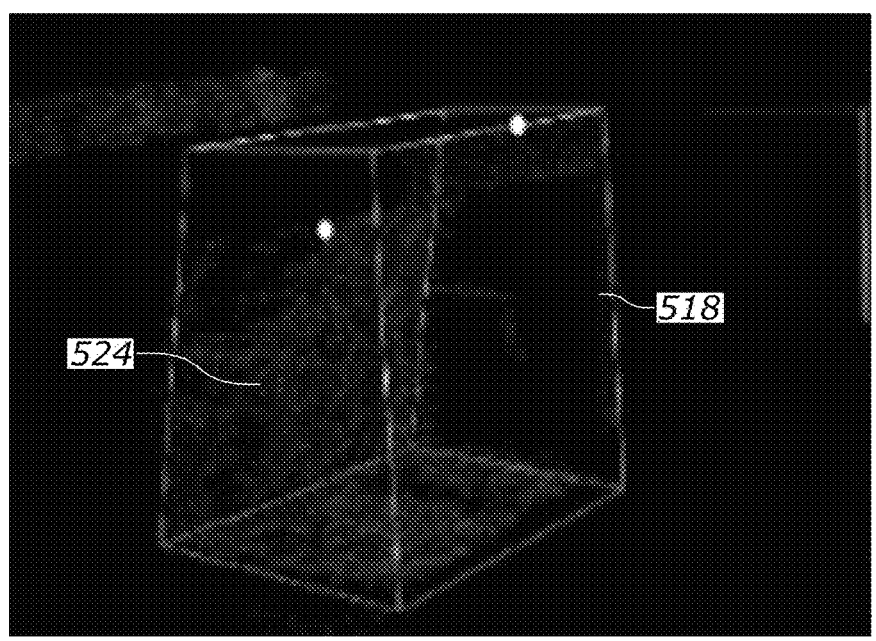

For example, FIG. 5D depicts an example embodiment of an initial a pre-configuration file, and, in particular, a graphical representation of a pre-configuration file 516. As shown by FIG. 5D, the pre-configuration file 516 may define a digital bounding box 518 having dimensions representative of a predefined search space (e.g., predefined search space 101). Generally, as shown by FIG. 4 (blocks 402-408), a pre-configuration file is generated only once during LMU installation. That is, when a shipping container (e.g., shipping container 102) is initially located/localized in a predefined search space 101, or when an LMU is installed in a predefined search space 101, a corresponding pre-configuration file may be generated and reused for various loading sessions (e.g., across many loading sessions and for various shipping container types) as described herein. In various embodiments, the initial a pre-configuration file is generally generated before a shipping container loading session.

In the embodiment of FIG. 4, at block 402, the LMU (e.g., LMU 202) is adjusted to a position for capturing 3D image data/container point cloud data. FIG. 5A depicts an example embodiment of 3D image data, rendered as point cloud data 504, captured for a generation of a pre-configuration file.

At block 404, 2.5D template matching is performed where a 2D view 506 of the predefined search space 101 (with shipping container 102) is matched or otherwise combined with a perspective view 510 of the predefined search space 101 (with shipping container 102). In some embodiments, 2D view 506 may comprise a 2.5D image converted from 3D point cloud data 504. As depicted, 2D view 506 includes dimension and sizing analysis and views of different areas of the point cloud data, including, for example, sizes and shapes of walls, openings, or otherwise areas of 2D view 506 and the size and shape of an initial front board area 509. Front board area 509 may correspond to a frontal area 103 of FIG. 1. Perspective view 510 includes initial bounding box portions 512 drawn and generated around point cloud data 514. Point cloud data 514 may be a representation of, such as a portion or subset of, point cloud data 504.

At block 404, each of the 2D view 506 and perspective view 510, including the data, information, and otherwise features from each, are combined output as pre-configuration file 516. Configuration file 516 is graphically represented by FIG. 5D, and has bounding box 518 generated from initial bounding box portions 512 by graphically shrinking, or otherwise repositioning (e.g., by processor(s) of LMU 202 or server 301) the initial bounding box portions 512 to enclose point cloud data 524. Point cloud data 524 may be a representation of, such as a portion or subset of, point cloud data 514.

At block 408, pre-configuration file 516 is saved for loading and use at block 412 as described herein. The pre-configuration file includes the bounding box 518 representative of the predefined search space 101.

At block 412, the container auto-configuration app loads the initial a pre-configuration file corresponding to the predefined search space 101. The container auto-configuration app uses the pre-configuration file as auxiliary information for reducing the localization search space (i.e., the predefined search space 101) for newly captured 3D image data for current or target shipping containers (e.g., shipping container 102). Bounding box 518 is applied to the new 3D image data captured in block 410 generate a point cloud representation of the current or target shipping container (e.g., shipping container 102), and its contents (.e.g., package 107), being loaded during the current or target shipping container loading session. The target shipping container is generally positioned in the same or substantially similar area or space (e.g., the predefined search space 101), such that 3D image data captured for the target shipping container is the same or substantially similar to that that was captured for the initialization container during pre-configuration and generation of the pre-configuration file as described herein (blocks 402-408). In this way, bounding box 518 accurately maps the position of the 3D image data for the target shipping container onto the dimensions of the bounding box 518. For example, the bounding box 518 may be used to set a position of the ground (a ground wall) or other walls within the 3D image representing target shipping container (e.g., shipping container 102).

Figure 6B:
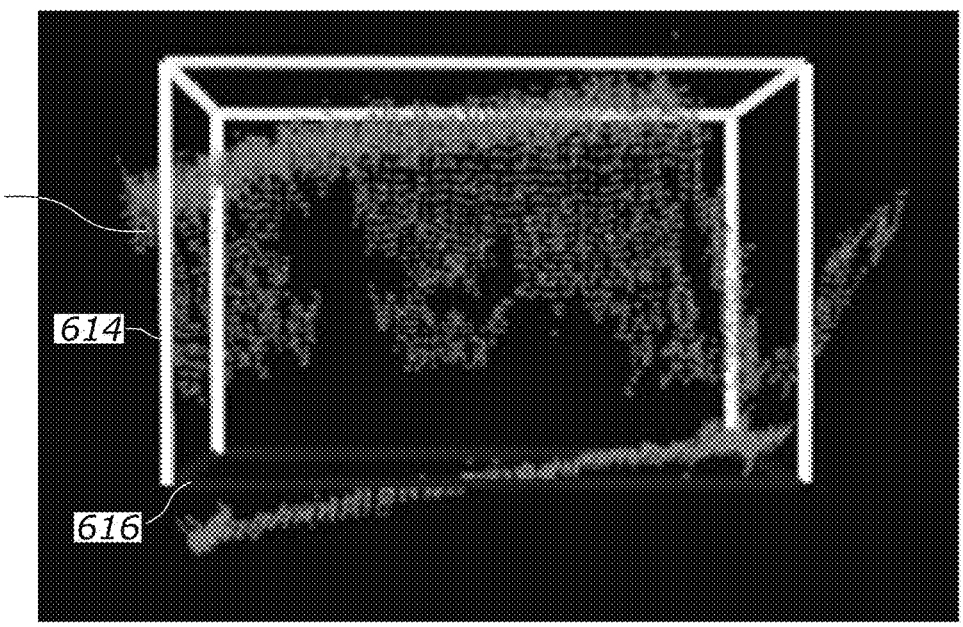

FIG. 6B depicts an example embodiment of a 3D image 610 that includes point cloud data 612 bounded by bounding box 614. Bounding box 614 includes walls, including ground wall 616. 3D image 610 represents an embodiment of the bounding box 518 (as represented by bounding box 614) applied to the point cloud data 602 (as represented by bounding box 614) as captured by 3D-depth camera 254. Ground wall 616, or a least a portion thereof, such as a front portion, may represent an initial front board area of the digital bounding box 614. Such initial front board area may correspond to, for example, initial front board area 509 of FIG. 5B as described herein. As shown, 3D image 610 represents an initial matching of the new 3D image data captured for the target shipping container (e.g., shipping container 102) and bound by the bounding box 616 as determined during pre-configuration routine and generation of the pre-configuration file (blocks 402-408).

At blocks 414 and 416, the container auto-configuration app determines areas, walls, and other attributes of the target shipping container (e.g., shipping container 102) from the captured 3D image data. If the target shipping container (e.g., shipping container 102) is of a type that requires bounding box splitting, algorithm 400, as implemented by the container auto-configuration app, will proceed to block 414. Otherwise algorithm 400 proceeds to block 416.

Figure 6C:
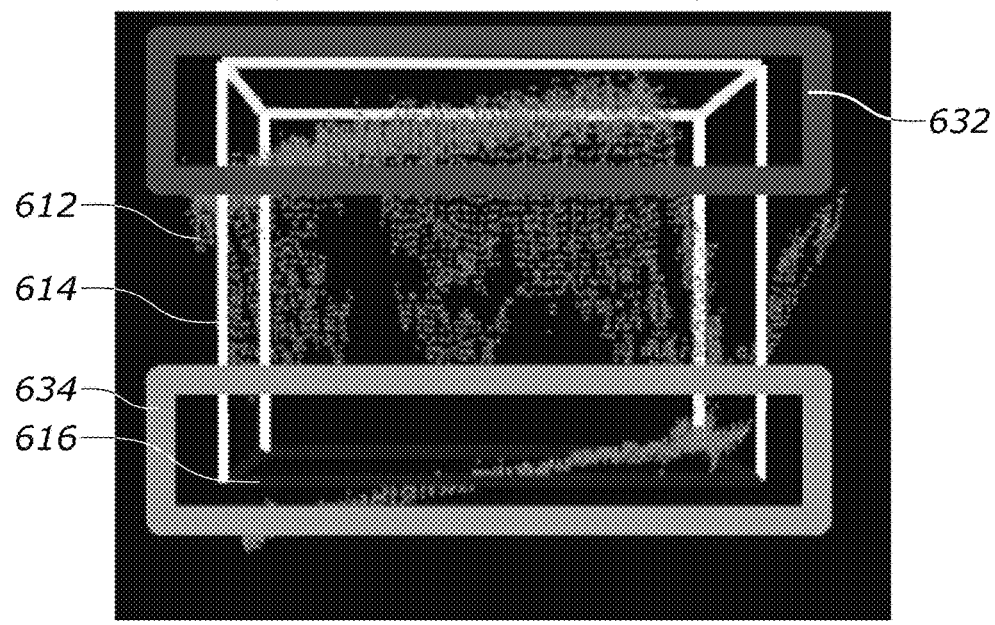
Figure 6D:
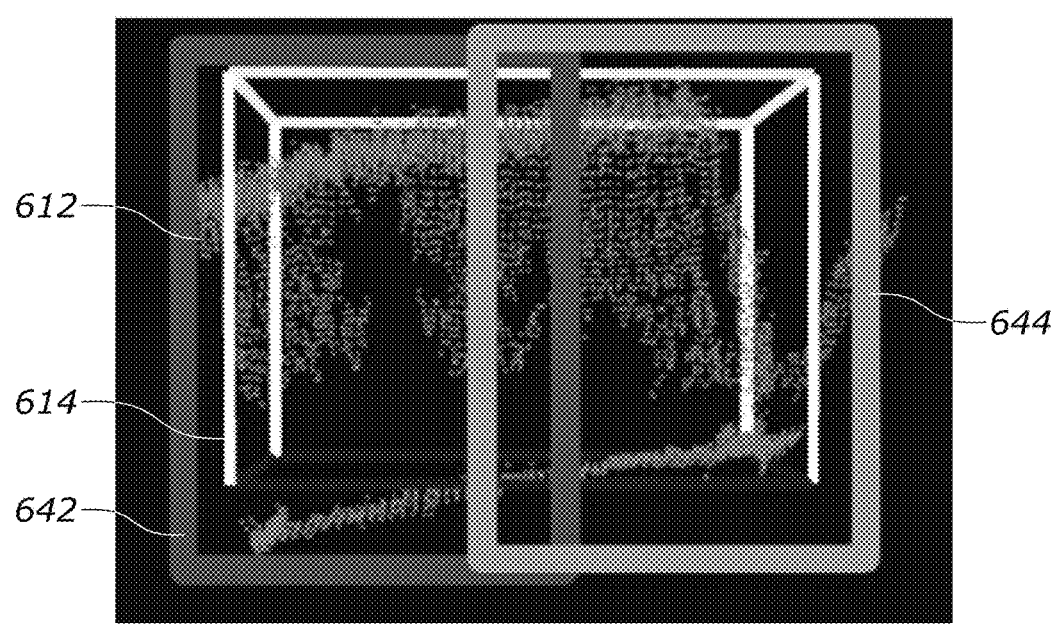

At block 414, container auto-configuration app determines that the target shipping container (e.g., shipping container 102) is of a type that requires bounding box splitting. Shipping container types that require bounding box splitting are generally small containers (e.g. AKE, APE, and AYY). However, other container types may also require bounding box splitting, such as container types having curved or abnormal shapes. In any event, a split bounding box allows for multiple bounding boxes that together may fit into, or better represent the volume of, a smaller, curved, or abnormal container have a small or unusual container shapes. FIG. 6D depicts an example embodiment of a 3D image 640 with two separate regions, i.e., a first bounding box area portion 642 and a second bounding box area portion 644. Each of first bounding box area portion 642 and a second bounding box area portion 644 are superimposed on top of, or otherwise applied to, point cloud data 612 and bounding box 614 as describe herein with respect to FIG. 6B. As shown by FIG. 6D, upon being split by the container auto-configuration app the digital bounding box 614 would define a split-scale container, where the split-scale container includes a first bounding box area portion 642 and a second bounding box area portion 644. As shown, the first bounding box area portion may at least partially overlap the second bounding box area portion as shown. In the disclosed embodiment, the first bounding box area portion is on the left and the second bounding box area is on the right, however, orientation as to the first and second orientations may be reversed. In this way, for smaller or abnormally dimensioned containers, the container auto-configuration app splits the prior bounding box (e.g., bounding box 614) into two separate regions (e.g., a left and right region) with partial overlaps. The walls, areas, and/or dimensions for the split containers/bounding boxes are determined in the same or similar manner as described herein.

At block 416, the container auto-configuration app determines point cloud segmentation, which includes determining walls, areas, and/or dimensions of the target shipping container (e.g., shipping container 102) of the current loading session. In particular, at block 416, the container auto-configuration app identifies an initial front board area of the digital bounding box within the 3D image data. The initial front board area is a specific area defined for the digital bounding box. FIG. 6C depicts an example embodiment of a 3D image 630 with two separate regions, i.e., a first bounding box area portion 632 and a second bounding box area portion 634. Each of first bounding box area portion 632 and a second bounding box area portion 634 are superimposed on top of, or otherwise applied to, point cloud data 612 and bounding box 614 as describe herein with respect to FIG. 6C. The container auto-configuration app searches 3D image 630 and locates the initial front board area 616, which, in the current embodiment, is located in second bounding box area portion 634. As described herein, the initial front board area 616 is used as a starting point, within the 3D image 630, to determine other features or attributes of the target container within 3D images, such as walls (e.g., right, left, ground walls), areas, surfaces, of the target container (e.g., shipping container 102). Thus, as described herein, algorithm 400, as implemented by container auto-configuration app, segments and/or identify the target container's front board, and then its left, right, ground walls/boundaries based on the bounding box and initial front board area 616 as originally obtained during pre-configuration (e.g., obtained during LMU 202 installation).

Figure 6E:
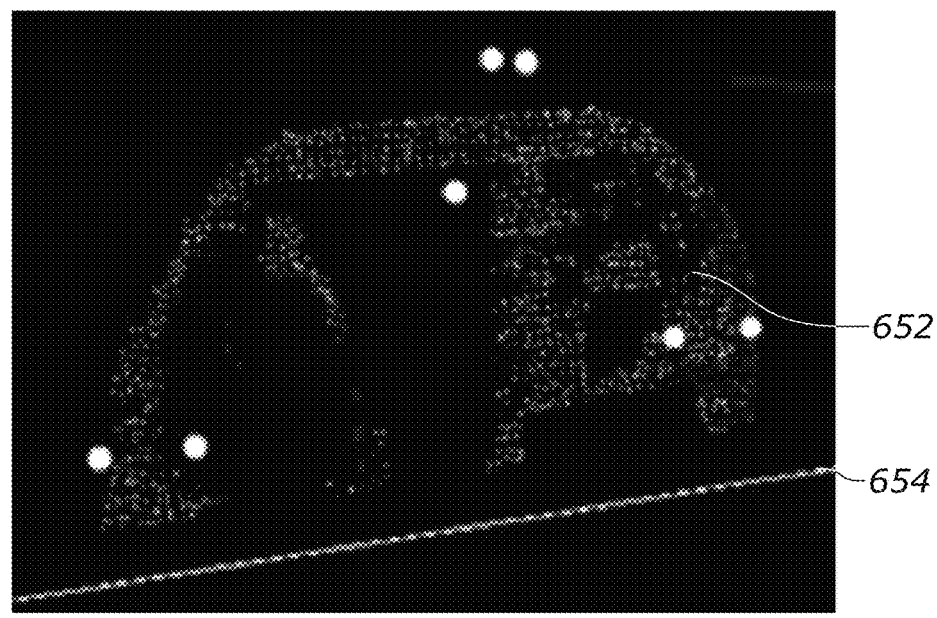
Figure 6F:
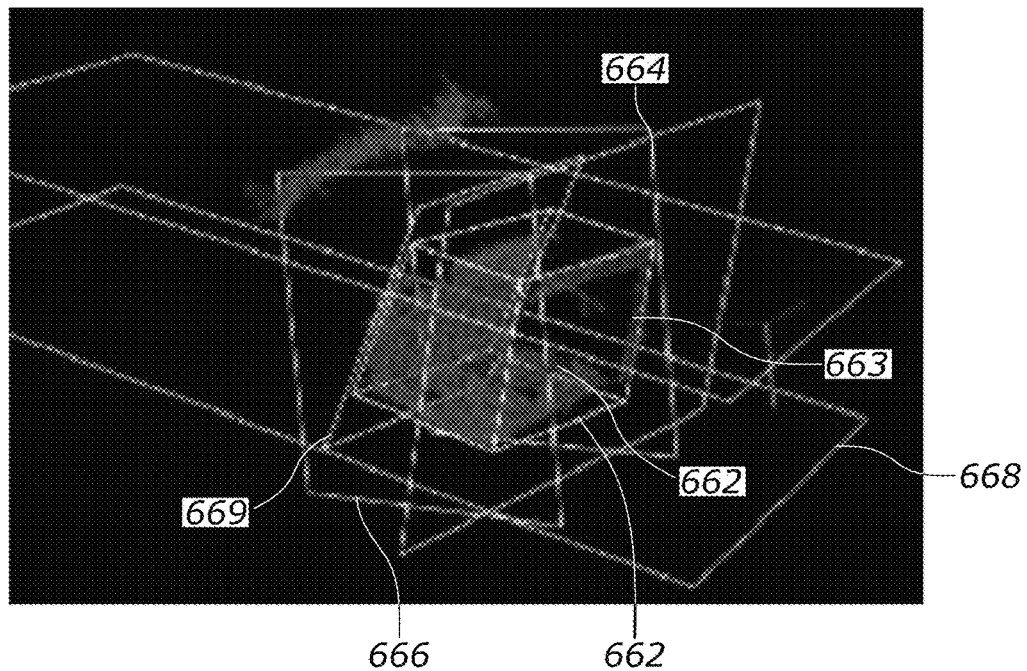

At block 418, the container auto-configuration app performs container front board outlier removal to eliminate loader and package interference. For example, during normal loading operations, packages and loaders might be close to ULD doors, which can cause interference with 3D data capture. The auto-configuration app executes, as part of algorithm 400, executes an outlier removal routine to remove the interference data. FIG. 6E depicts an example embodiment of a 3D image 650 that includes initial front board area 654 and a container point cloud 652 (e.g., point cloud data). Container point cloud 652 corresponds to point cloud data 612 as described herein for FIGS. 6B and 6C. Initial front board area 654 corresponds to initial front board area 509 and/or initial front board area 616 as described for FIGS. 5B, and 6B, respectively. Accordingly, initial front board area 654 is a portion of a bounding box of 3D image 650 (e.g., bounding box 518 or 614). The container auto-configuration app is configured to apply the digital bounding box to the container point cloud 652 of 3D image 650 to remove front board interference point cloud data from the container point cloud based on the initial front board area 654. The front board interference data can include point cloud data defining a loader (e.g., loader 105) or a package (e.g., 104) that is positioned in front of the target shipping container. In general, however, this can be anything obstructing the front board area. At block 418, the container auto-configuration app executes to removes or deletes all point cloud data at a position outside of the initial front board area 654 from the perspective of the interior of the imaged target shipping container (e.g., shipping container 102). For example, point cloud data is generally represented in 3D space with x, y, and z coordinate. In some embodiments, points having x, y, and/or z coordinates falling outside of the initial front board area 654 from the perspective of the interior of the imaged target shipping container (e.g., shipping container 102) would be removed or deleted from the 3D image 650. Removal of the front board interference data more accurately defines the target shipping container (e.g., shipping container 102) within the predefined search space 101 and allows the 3D image to appear, in 3D data form or format, as the real-life target shipping container (including its contents) as it would without any interference or obstacles obstructing the target shipping container.

At block 420, the container auto-configuration app preforms a front board analysis to determine the left, right and top edges of a refined front board area. In one embodiment, for example, the container auto-configuration app generates a refined front board area based on the shipping container type. The refined front area board may define each of (1) a right edge, (2) a left edge, and (3) a top edge of the refined front board area as determined based on the dimensions of the shipping container type. For example, the container auto-configuration app may shrink or match the right, left, and/or top edges to align the position of these edges within the point cloud data so as to represent the shipping container type. The refined front board area is used, by container auto-configuration app, to improve the accuracy, dimensioning, or fit of the target shipping container within the 3D image, as further described herein.

At block 422, the container auto-configuration app may perform a left, right, and ground wall regression. Because different types/shapes of shipping containers have different front shapes (e.g., rectangle, polygon, curvy), the front panel segmentation algorithm analyzes the front board and can shrink (regress) from outside to inside to find shipping container boundaries (e.g., ULD boundaries) on top, left, and right. In one embodiment, for example, the container auto-configuration app may be further configured to generate an adjusted digital bounding box by modifying, based on the refined front board area (as determined with respect to block 420) and the shipping container type (e.g., a shipping container type of shipping container 102), one or more graphical (digital) walls of the original digital bounding box (e.g., bounding box 614).

FIG. 6D depicts an example embodiment of a 3D image 660 that includes container point cloud 662 (e.g., point cloud data). Point cloud data 662 corresponds to container point cloud 652 of FIG. 6E and point cloud data 612 as described for FIGS. 6B, 6C, and 6D here. 3D image 660 also includes a target shipping container 663 within the 3D image as described above with respect to block 420. 3D image 660 further includes various graphical/digital walls. The one or more digital walls can include at least (1) a left wall 664, (2) a right wall 666, and (3) a ground wall 668. Modification of the one more digital walls can include regressing, such as digitally shrinking or adjusting, the digital walls from outwardly to inwardly positions within a 3D image so as to bring the digital walls closer together to confine or surround a volume or space of the captured 3D image data (e.g., container point cloud data) with the graphical walls. That is, modifying one or more digital walls (664-669), which can include digital of the bounding box, can include the container auto-configuration app shrinking positions of one or more of the one or more digital walls from one or more outside positions of the digital bounding box to one or more respective inside positions of the digital bounding box. The walls may also be grown/stretched or otherwise adjusted. In this way, the original positions of the digital bounding box may be adjusted to fit the target shipping container 663 within the 3D image.

In some embodiments, the ground wall (i.e., floor) of the target shipping container (e.g., shipping container 102) may be located or determined by the container auto-configuration app within 3D image 660 based on position of the LMU 202 with respect to the shipping container 102. For example, in one embodiment, ground wall 668 may modified within 3D image 660 based on an assumption that ground wall 668 has a known relative position to a front of the LMU 202 or other such mountable device. The relative position may be a distance or other measurement between the LMU 202 with respect to the shipping container 102. In some embodiments, for example, the known relative position may be a perpendicular position, where the LUM 202 is installed at a position perpendicular to the shipping container. Thus, ground wall 668 may be positioned within the 3D image based on this prior assumption where the ground wall position is a known factor based on information (e.g., a distance to the ground) determined during the pre-configuration stage.

At block 424, the container auto-configuration app may perform a front panel completeness analysis. This may include, for example, determining whether a front panel or wall of the target shipping container has been determined within the 3D image. For example, with respect to FIG. 6D, auto-configuration app may detect the front panel of target shipping container 663 based on the location of a refined front board area 662 of target shipping container 663. Refined front board area 662 may correspond to initial front board area 654 of FIG. 6E, but where refined front board area 662 may have been adjusted during modification of the digital walls (as discussed above herein) to generate refined front board area 662. Refined front board area 662 may be different from initial front board area 654 based on the repositioning or resizing of initial front board area 654 and/or wall(s) associated with front board area 654.

In additional embodiments, the back wall of a shipping container (e.g., shipping container 102) may be inferred based on the known ULD type and dimension along with the detected front panel. For example, in an embodiment, the one or more digital walls of the target container of the 3D image 660 may further include a back wall 669. Back wall 669 may be inferred or determined, within the 3D image 660, based on the shipping container type. For example, based on the known size and/or dimensions of a shipping container type (e.g., AKE), the position of the back wall may be determined by placing the back wall at the same relative distance, within the 3D image 660, that the back wall would have for the same container type in real life. In some embodiments, the back wall is inferred based on the refined front board area, where the relative distance of the back wall is determined beginning from the position of the refined front board area 662 to the rear of the target shipping container 663 within the 3D image 660.

Figure 6G:
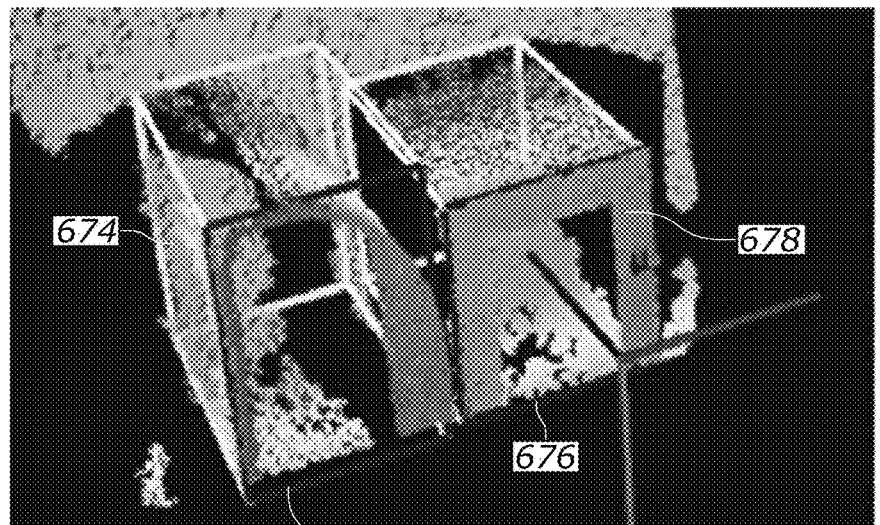

At block 426, the container auto-configuration app outputs a configuration result that includes a 3D image with an accurate location (bounding box) configuration and includes a 3D, digital, representation of the contents (e.g., package 107) of the target shipping container (e.g., shipping container 102). That is, container auto-configuration app is configured to generate an auto-configuration result that comprises the adjusted digital bounding box containing at least a portion of the container point cloud. For example, FIG. 6G depicts an example embodiment of a 3D image 670 that includes adjusted digital bounding box 672 having point cloud data 674 and digital bounding box 676 having point cloud data 678. The embodiment of FIG. 6G is an example auto-configuration result that required bounding box splitting as described for block 414. Thus, multiple (in this case two) bounding boxes 672 and 676 were generated, each having their own respective point cloud data 674 and 678 respectively. Each bounding box 672 and 676 includes at least a portion of the originally captured container point cloud information as represented by the point cloud data 674 and 678, respectively. Point cloud data 674 and point cloud data 678 each comprise a 3D representation of the contents (e.g., package 107), positions, and dimensions of the target shipping container(s) (e.g., shipping container 102).

Figure 6H:
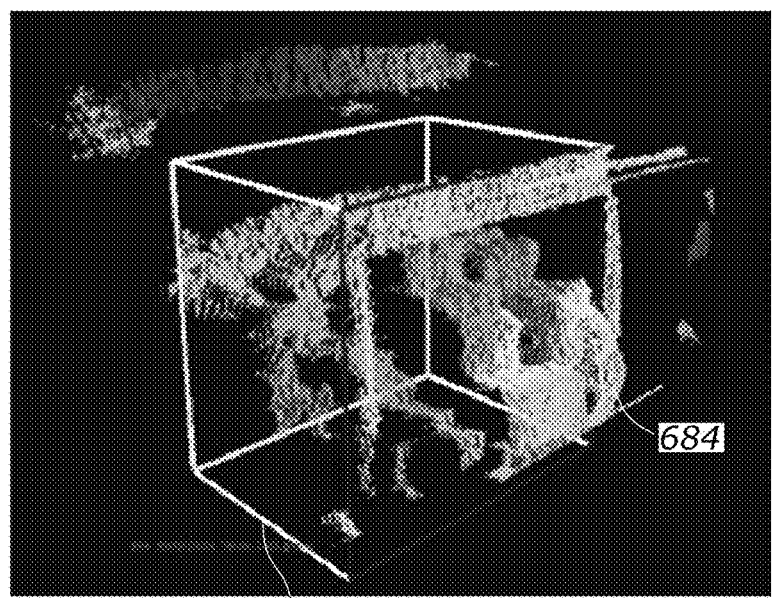

Similarly, FIG. 6H depicts an example embodiment of a 3D image 680 that includes adjusted digital bounding box 682 having point cloud data 684. The embodiment of FIG. 6H is an example auto-configuration result that did not include bounding box splitting. Bounding box 682 includes at least a portion of the originally captured container point cloud information as represented by the point cloud data 684. Point cloud data 684 is a 3D representation of the contents (e.g., package 107), positions, and dimensions of the target shipping container(s) (e.g., shipping container 102).

In some embodiments, the auto-configuration result, as output by container auto-configuration app, is a digital file that is output and may be used by managers and/or loaders to load, analyze, or manage details of packages being loading into shipping containers as described herein.

Figure 7:
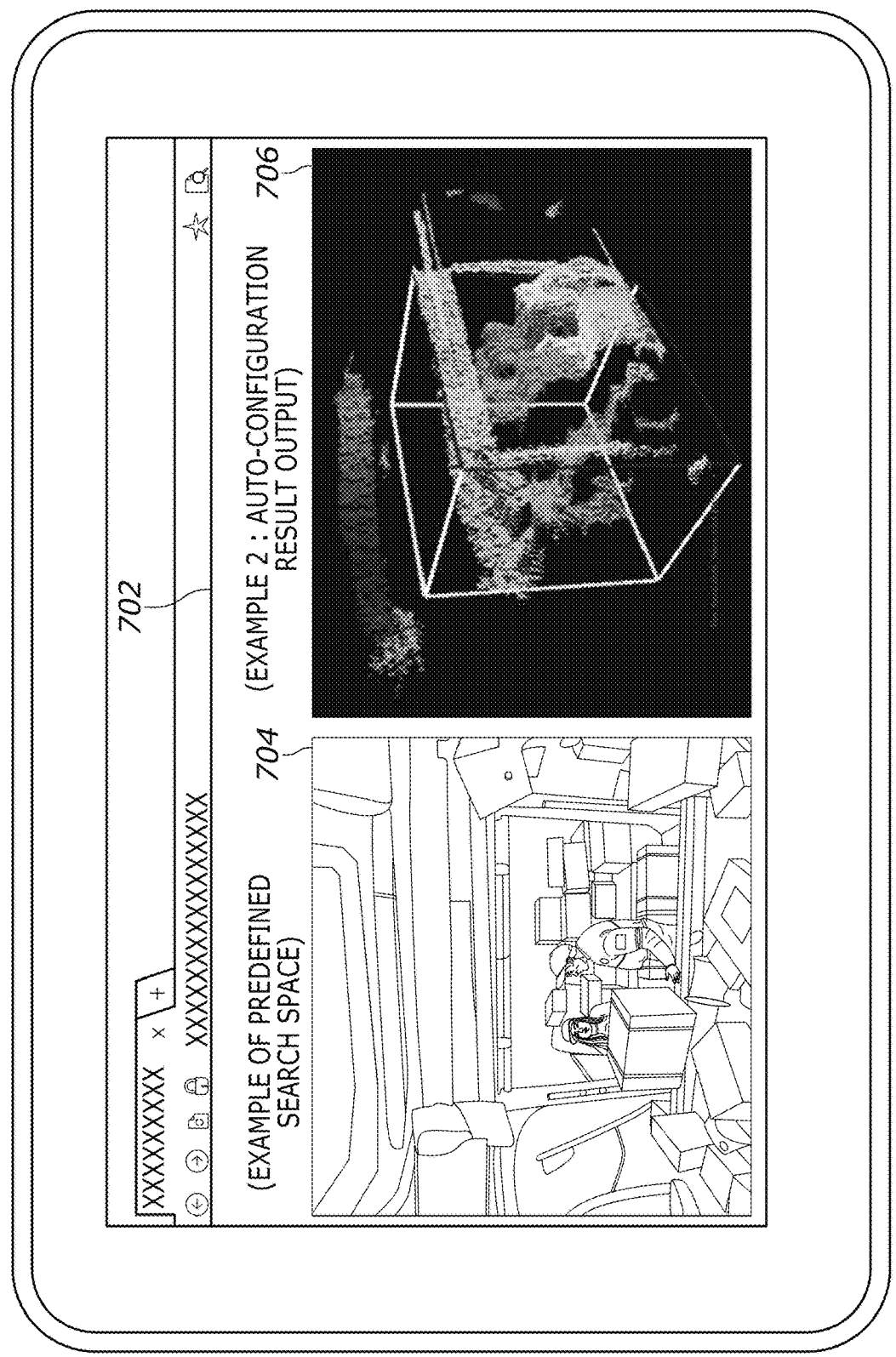
FIG. 7 illustrates a client device displaying a guided user interface (GUI) depicting an auto-configuration result as generated in accordance with FIG. 4, and in accordance with example embodiments herein.

FIG. 7 illustrates a client device 700 displaying a guided user interface (GUI) 702 depicting an auto-configuration result 706 as generated in accordance with FIG. 4, and in accordance with example embodiments herein. In some embodiments, GUI 702 may be rendered by a dashboard app installed and executing on client device 700. Dashboard app may also display various metrics (not shown).

In various embodiments, image data/datasets and/or post-scanning data may be received on client device 700. Client device 700 may implement the dashboard app to receive the image data and/or the post-scanning data and display such data, e.g., in graphical or other format, to a manager or loader to facilitate the unloading or loading of packages (e.g., 104, 107, etc.), as described herein. In some embodiments, dashboard app may be implanted as part of Zebra Technologies Corps.'s SmartPack™ container loading analytics (CLA) solution. The dashboard app may be installed on client devices (such as client device 700) operating in loading and shipping facilities (e.g., a loading facility as depicted by FIG. 1). Dashboard app may be implemented via a web platform such as Java J2EE (e.g., Java Server Faces) or Ruby on Rails. In such embodiments, the web platform may generate or update a user interface of the dashboard app via generation of a dynamic webpage (e.g., using HTML, CSS, JavaScript) or via a client-facing mobile app (e.g., via Java for a Google Android based app or Objective-C/Swift for an Apple iOS based app), where the user interface is displayed via the dashboard app on the client device, e.g., client device 700.

In some embodiments, the dashboard app may receive the image data/datasets and/or the post-scanning data and display such data in real-time. Client device 700 may be a mobile device, such as a tablet, smartphone, laptop, or other such mobile computing device. Client device 700 may implement an operating system or platform for executing the dashboard (or other) apps or functionality, including, for example, any of the Apple iOS platform, the Google Android platform, and/or the Microsoft Windows platform. Client device 700 may include one or more processors and/or one or more memories implementing the dashboard app or for providing other similar functionality. Client device 700 may also include wired or wireless transceivers for receiving image data and/or post-scanning data as described herein. Such wired or wireless transceivers may implement one or more communication protocol standards including, for example, TCP/IP, WiFi (802.11b), Bluetooth, or any other similar communication protocols or standards.

In the embodiment of FIG. 7, client device 700 shows a GUI screen of a predefined search space having a target container a (e.g., predefined search space 101 having shipping container 102) as depicted for FIG. 1 together with the auto-configuration result 706 generated for the target container as the result of algorithm 400 as described with respect to FIG. 4.

Generally, as would be understood by one of skill in the art from the present disclosure, certain benefits accrue from the techniques and features described herein. The 3D depth imaging systems and methods described herein provide a localization technique to obtain an initial localization configuration (e.g., a pre-configuration file) as pre-routine information for a further dynamic auto-configuration purpose. In addition, the 3D depth imaging systems and methods described herein allow for segmentation of a target container's front board, left, and right boundaries based on the pre-routine information. This is typically performed for large ULDs so as to accommodate space and positioning for same size or smaller shipping containers.

The 3D depth imaging systems and methods described herein provide an outlier removal technique, as part of algorithm 400, that reduces loader and package interference. In addition, the 3D depth imaging systems and methods described herein include a unique technique for detecting top, left, and right edges of front board based on an outside-to-inside approach which is robust for various types/shapes of containers. Further, the 3D depth imaging systems and methods described herein provide a technique for splitting prior bounding boxes into two partially overlapped bounding boxes for small container auto-configuration on split scales. In addition, the 3D depth imaging systems and methods described herein provides techniques that infer other walls (e.g., left, right, and ground walls) of target container based on the analytic results of the front panel and the known shipping container type and dimensions.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A three-dimensional (3D) depth imaging system for dynamic container auto-configuration, the 3D depth imaging system comprising:

a 3D-depth camera configured to capture 3D image data, the 3D-depth camera oriented in a direction to capture 3D image data of a shipping container located in a predefined search space during a shipping container loading session, the shipping container having a shipping container type; and a container auto-configuration application (app) configured to execute on one or more processors and to receive the 3D image data, the container auto-configuration app configured to determine, based on the 3D image data, a container point cloud representative of the shipping container, wherein the container auto-configuration app is further configured to execute on the one or more processors to:

(a) load an initial a pre-configuration file corresponding to the predefined search space, the pre-configuration file defining a digital bounding box having dimensions representative of the predefined search space, and the digital bounding box having an initial front board area, (b) apply the digital bounding box to the container point cloud to remove front board interference data from the container point cloud based on the initial front board area, (c) generate a refined front board area based on the shipping container type, (d) generate an adjusted digital bounding box by modifying, based on the refined front board area and the shipping container type, one or more digital walls of the digital bounding box, and (e) generate an auto-configuration result that comprises the adjusted digital bounding box containing at least a portion of the container point cloud.

2. The 3D depth imaging system of claim 1, wherein the 3D-depth camera and the one or more processors are housed in a mountable device.

3. The 3D depth imaging system of claim 2, wherein the ground wall is modified based on an assumption that the ground wall has a known relative position to a front of the mountable device.

4. The 3D depth imaging system of claim 3, wherein the known relative position is a perpendicular position.

5. The 3D depth imaging system of claim 1, wherein the one or more processors are located at a server communicatively coupled to the 3D-depth camera via a digital network.

6. The 3D depth system of claim 1, wherein the shipping container is an aircraft-based shipping container.

7. The 3D depth imaging system of claim 1, wherein the shipping container is a unit load device (ULD).

8. The 3D depth imaging system of claim 7, wherein the shipping container type is a ULD type being one of: an AMJ type, an AAD type, an AKE type, an AYY type, a SAA type, an APE type, or an AQF type.

9. The 3D depth imaging system of claim 7, wherein the predefined search space is determined based on at least one ULD type.

10. The 3D depth imaging system of claim 1, wherein shipping container is selected from one of several differently dimensioned containers.

11. The 3D depth imaging system of claim 1, wherein the front board interference data is point cloud data defining a loader or a package.

12. The 3D depth imaging system of claim 1, wherein the initial a pre-configuration file is generated before the shipping container loading session.

13. The 3D depth imaging system of claim 1, wherein modifying the one or more digital walls of the digital bounding box includes shrinking positions of one or more of the one or more digital walls from one or more outside positions of the digital bounding box to one or more respective inside positions of the digital bounding box.

14. The 3D depth imaging system of claim 1, wherein the one or more digital walls further include a back wall, and wherein the back wall is inferred based on the shipping container type.

15. The 3D depth imaging system of claim 1, wherein the digital bounding box defines a split-scale container, wherein the split-scale container is split into a first bounding box area portion and a second bounding box area portion, and wherein the first bounding box area portion at least partially overlaps the second bounding box area portion.

16. The 3D depth imaging system of claim 1, further comprising a dashboard app, the dashboard app executing on a client device implementing a GUI, the GUI graphically indicating the auto-configuration result.

17. The 3D depth imaging system of claim 1, wherein the 3D image data is 3D point cloud data.

18. The 3D depth imaging system of claim 1, wherein the 3D image data is captured periodically.

19. The 3D depth imaging system of claim 17, wherein the 3D image data is captured at any of: every 30 seconds, every minute, or every two minutes.

20. A three-dimensional (3D) depth imaging method for dynamic container auto-configuration, the 3D depth imaging method comprising:
 capturing, by a 3D-depth camera, 3D image data of a shipping container located in a predefined search space during a shipping container loading session, the shipping container having a shipping container type;
 receiving, at a container auto-configuration application (app) executing on one or more processors, the 3D image data;
 determining, by the container auto-configuration app, a container point cloud representative of the shipping container based on the 3D image data;
 loading, by the container auto-configuration app, an initial a pre-configuration file corresponding to the predefined search space, the pre-configuration file defining a digital bounding box having dimensions representative of the predefined search space, and the digital bounding box having an initial front board area;
 applying, by the container auto-configuration app, the digital bounding box to the container point cloud to remove front board interference data from the container point cloud based on the initial front board area;
 generating, by the container auto-configuration app, a refined front board area based on the shipping container type;
 generating, by the container auto-configuration app, an adjusted digital bounding box by modifying, based on the refined front board area and the shipping container type, one or more digital walls of the digital bounding box; and
 generating, by the container auto-configuration app, an auto-configuration result that comprises the adjusted digital bounding box containing at least a portion of the container point cloud.

* * * * *